Aug. 22, 1950
ALFRED PAUL MILL
NOW BY JUDICIAL CHANGE OF NAME
ALFRED PAUL MILL COCHRANE
WORM AND NUT MECHANISM
2,519,777
Filed Nov. 5, 1946
3 Sheets-Sheet 1
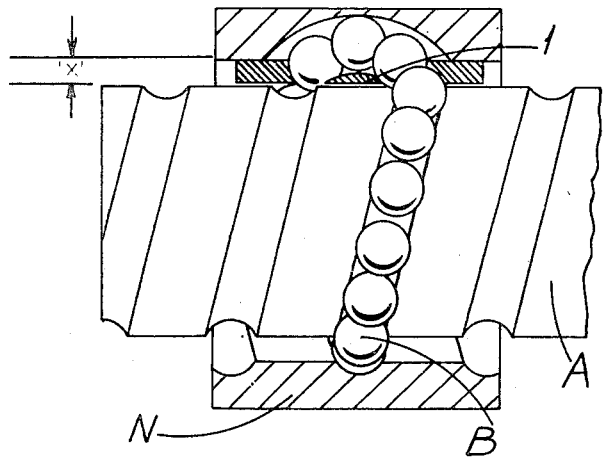
*Fig. 1.*
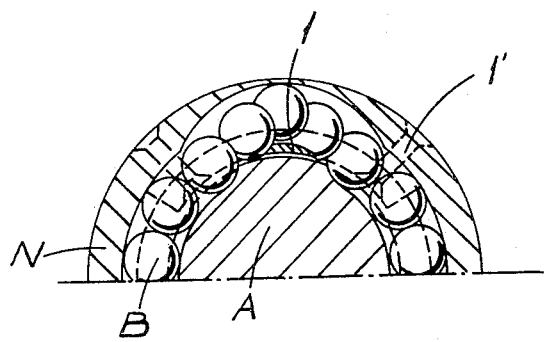
*Fig. 2.*
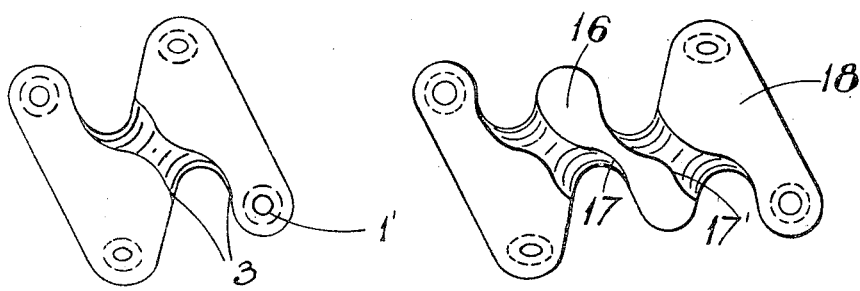
*Fig. 3.*   *Fig. 3.a.*
INVENTOR
ALFRED PAUL MILL
NOW BY JUDICIAL CHANGE OF NAME,
ALFRED PAUL MILL COCHRANE
By his attorneys
Baldwin & Wight Aug. 22, 1950 ALFRED PAUL MILL 2,519,777
NOW BY JUDICIAL CHANGE OF NAME
ALFRED PAUL MILL COCHRANE
WORM AND NUT MECHANISM
Filed Nov. 5, 1946 3 Sheets-Sheet 2
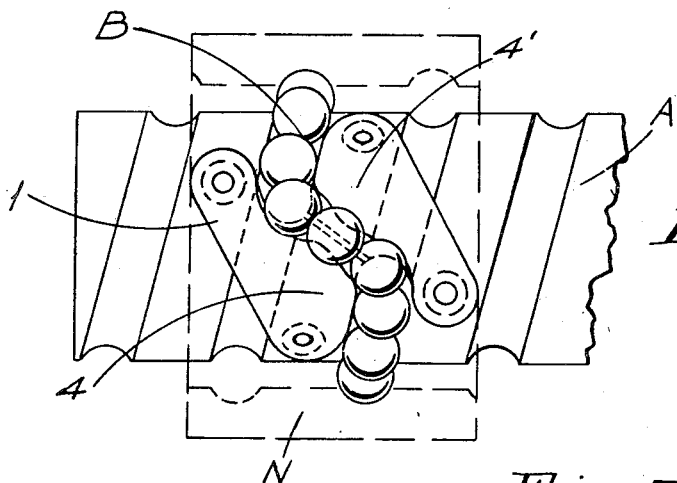
Fig. 4.
Fig. 7.
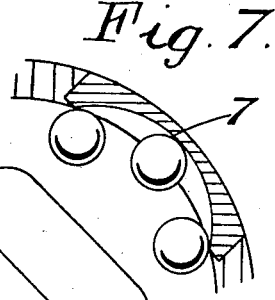
Fig. 6.
Fig. 5.
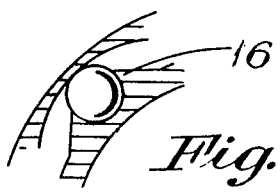
Fig. 8.
INVENTOR
ALFRED PAUL MILL
NOW BY JUDICIAL CHANGE OF NAME
ALFRED PAUL MILL COCHRANE
By his attorneys,
Baldwin & Wight

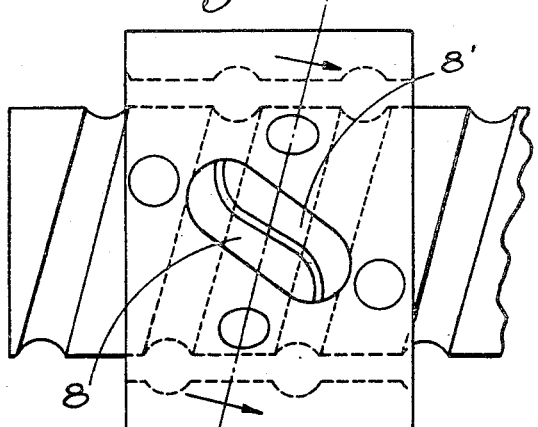
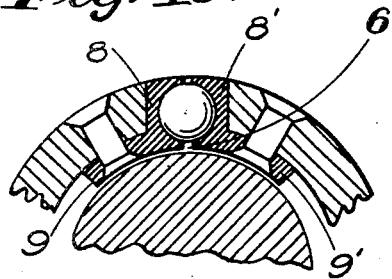
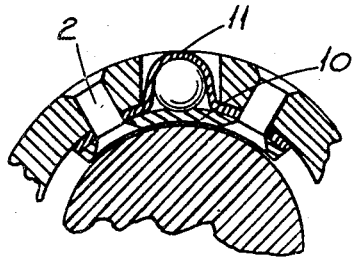
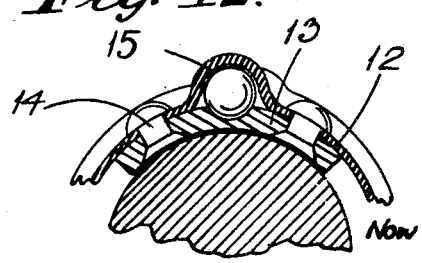

Patented Aug. 22, 1950

2,519,777

UNITED STATES PATENT OFFICE 2,519,777

WORM AND NUT MECHANISM

Alfred Paul Mill, Coulsdon, England, now by judicial change of name Alfred Paul Mill Cochrane Application November 5, 1946, Serial No. 707,918
In Great Britain January 18, 1946

10 Claims. (Cl. 74—459)

This invention relates to worm and nut actuating mechanism of the type in which the driving connection between the worm shaft and the nut is by means of a train of spherical balls contained and free to move and continuously circulate in one or more helical convolutions formed by the respective helices of the worm shaft and its nut so that rotary movement of the shaft in either direction is translated into an endwise or axial displacement of the nut, or vice versa.

Mechanism of this type is especially suited to steering gear, but it has many applications, and can be adapted to screw jacks, lead screws, aircraft actuators and the like.

Various methods have before been proposed for providing means of re-circulating an endless path of balls and more especially in relation to the transfer of the balls in a single helical convolution by means of end stops projecting into the screw grooving and a connecting channel formed substantially within the confines of the nut wall.

These known constructions present difficulties in the provision of a substantially curved transfer path which is an essential pre-requisite for smooth ball transfer action, as it can be geometrically demonstrated that any sudden change in direction of the ball transfer path causes a variation in the length of the string of balls in transfer which, under load can cause faulty action.

The object of this invention is to provide an improved means of transfer for the balls in their passage between the ends of the helix and in which friction is reduced to a minimum.

According to the invention, in their transfer movement from one end of the helical convolution to the other, the balls are guided by a bridge member located or substantially located between the worm shaft and its nut and secured to the latter and extending substantially across three screw crests, said member being formed with a groove or channel the extremities of which register with the worm helix and are adapted to receive each ball on arrival at the end of the helical path between the worm and nut, and return it to the beginning of said path.

The bridge or guide member may consist of a segmental plate fastened to the nut, the latter being modified to provide a complementary transfer roof for the balls.

The segmental plate may be in one piece, or for convenience in manufacture it may be found convenient to construct it in two pieces, the separating line being along the central axis of the groove providing the ball path.

This invention has the advantage that it provides the equivalent to a generated track in an element which is separate from the nut and is itself simple and easy to manufacture, locate and affix, this element taking control as soon as the ball leaves the helical path and being almost wholly responsible for the entire transfer action so that the nut merely acts as a roof.

Furthermore by raising the balls above the crest of the screw the curve of the balls' path is improved with the very important further advantage that cross scrubbing action of the balls during transfer is avoided. Throughout the whole of this transfer movement it is thus possible to ensure that the change in direction of the circulating path of the balls is substantially curved in true view, and independent of the crest formation of the screw.

In an alternative construction the transfer roof in the nut itself may be eliminated by providing it in or by the bridge member itself.

The invention is illustrated in the accompanying drawings, wherein Figures 1 and 2 are respectively a sectional elevation and end view of a worm and nut assembly in accordance with this invention. Figure 3 is a plan view showing the transfer guide member. Figure 3a shows a modification.

Figure 4 is a plan view showing a two piece transfer member, split through the centre of the groove. Figure 5 is a detail view showing the transfer roof in the nut and Figures 6 and 7 the use of an insert to form the roof. Figure 8 is a part sectional view showing a modified guide member.

Figures 9 and 10 are respectively an elevation and part section showing a modified form of guide member with an integral transfer roof. Figure 11 is a sectional view showing another form of two piece guide member with the transfer roof attached thereto. Figure 12 shows a rolled nut with transfer element.

Referring to the accompanying drawings A indicates the worm and N the nut member of a worm and nut actuating mechanism fitted with balls B which are free to move and continuously circulate in the helix provided by the worm shaft. Rotary movement of the shaft in either direction is translated by the thrust transmitted through the balls B into an endwise or axial displacement of the nut or vice versa. In the arrangement shown in Figure 1 the balls occupy a single helix and the transfer movement of the balls from one end of the helical convolution to the other is effected according to this invention by an auxiliary guide member 1 which may take several forms as hereinafter described.

The guide member 1 is located between the worm A and the nut N and is secured to the nut by rivets 1' so as to be rigid therewith. The member 1 in the embodiment illustrated (see Figure 3) consists of a segmental plate and extends substantially over three screw crests. In operation it functions as a bridge to lift the balls from the end of their operative path in the helix and thus convey them back to the start.

It will be observed that between the nut and worm there is provided a sufficient clearance indicated at x to allow for the thickness of the transfer guide plate and the metal of the nut is cut away or modified to provide a transfer roof to accommodate the balls when passing over the bridge.

In the plate 1 is a central groove or channel 2, which in plan is in the form of an S having entrant lips or projecting guide arms 3 to receive or discharge the balls as the case may be on arrival at the ends of the bridge portion of the plate. In effect, the balls on leaving the end of the helical path are picked up by the open ends of the guide channel, passed upwardly therethrough and thus over the bridge before encountering a complementary contour which directs them into the other end of the helix. The starting curvatures of these contours may be tangential to the walls of the helix in all planes and may, if desired, be extended in advance of the normal point of ball pick up.

Instead of forming the auxiliary member in one piece as in Figures 1 and 2, it may be built up from two or more parts arranged to provide a transfer channel. In either event it may consist of machined parts, die castings, stampings or pressings and the like. It may thus consist of a plate divided for convenience in two pieces 4, 4' (see Figure 4) through the centre line of the groove providing the ball path.

In the arrangement of Figures 1 and 5 the nut is cut away internally as at 5 to accommodate the balls. The nut may be cut away internally by a rotary cutter operating inside the nut with its spindle in line with the axis of the nut. Alternatively a rotary formed cutter is detachably arranged on a spindle which passes through a hole of ball size or slightly larger in the nut wall at the virtual transfer channel centre, the spindle axis being at right angles to the nut axis. The said hole may be used for filling the circuit of balls and may be closed by a suitable plug, or bridged by a wire clip.

Instead of cutting away the wall of the nut, as described, the latter may be formed with a slot 6 for an insert 7 which is suitably formed to accommodate the balls. This arrangement simplifies machining.

In a modified arrangement instead of providing the complementary portion of the ball path i. e. the transfer roof in the nut itself, this may be provided in or by the auxiliary member itself as shown in Figure 9 or 10 in which the segmental plate is formed in two half sections 9 and 9' each embodying part of the groove or ball path and having upstanding side walls 8 and 8' which, as shown, may constitute the transfer roof proper, or may support or embody the same. The outer faces of the side walls 8 and 8' are machined to fit the slot 6 formed in the nut and the opposite faces and interior are channeled to provide two complementary half circles for the passage of the balls.

As applied to the form of plate shown in Figure 1 i. e. a plate in one piece, the plate may comprise an inner section 10 and an outer section 11 also in the form of a segmental plate as shown in Figure 11, being secured to the inner plate by the fixing rivets. The inner section provides the bridge or transfer passage proper, while the outer section constitutes the roof thereto, both sections being formed with complementary ball channels.

It will be appreciated that the two halves of the guide member may be constructed either by die casting methods or may consist of a solid cored casting. The transfer roof in the design shown in Figure 11 may consist of pressed sheet metal.

Referring now to Figure 12 there is shown a nut formed from a rolled tube 12 to which a guide member 13 is riveted as at 14. This arrangement enables the tube to be formed with a transfer groove or roof passage 15 which is complementary to the transfer passage 2. This construction has the further advantage as regards production costs that it simplifies the formation of the roof channel, since instead of cutting away the metal as in an ordinary machined nut (or providing an insert), the metal of the nut may be pushed outwardly to provide the complementary roof portion of the transfer channel.

Referring now to Figure 8, the segmental plate may be provided with a deep faced channel for the balls formed by thickening the cross section of the plate locally as at 16. In some cases it may be practical to continue the guide member in the form of helical strips so that it will act as a retainer for the full circuit of balls when the screw is removed from the nut, or the said retainer strips could be separate continuations of the transfer element.

Where a separate cover plate or insert is not employed for the roof, assembly may be carried out by sticking the full number of balls in position with grease and then carefully turning the screw into engagement.

It will be appreciated that several single helix convolutions may be used in a screw and nut assembly and the guiding member may be in one composite piece.

Thus it will be obvious that where multiple helices are used, two or more tracks full of balls may be provided with appropriate bridge members therefor.

Instead of independent bridge members and where accommodation is limited and it is desirable to restrict the length of the nut to a minimum, the adjacent bridge members may be closer coupled by combining the bridge members. The two piece segment shown in Figure 3 lends itself to such an arrangement and in a construction adapted for two sets of balls, the adjacent segmental pieces are combined to form a single central plate 16 (see Figure 3a, which is a developed view), having on its opposite edges two half tracks 17, 17', each combining with a half track on an outer end plate 18 to form two ball tracks.

This construction may equally be adapted to a three track close coupled bridge member. In practice, it may be found practical to manufacture the bridge element in separate central and end portions substantially as in Figure 4.

In a modified construction it is conceivable that in cases where a long nut is used, instead of the transfer passage being formed in the nut metal, the body of the screw may be cut away in a similar manner to provide the necessary depth to accommodate the balls in their transfer path. With this arrangement the bridge member, so termed, instead of being secured to the nut is anchored to the screw and clears the inner diameter of the nut.

The worm shaft may obviously constitute the driving or the driven member.

What I claim is:

1. Screw and nut actuating mechanism of the type having a screw member, a nut member spaced to provide a helical groove therebetween, and a train of spherical balls travelling in said groove, means in one of said members for transferring said balls from one end to the other of their helical path, comprising a bridge element secured to said last named member, and at least partially forming a transfer passage, said bridge element having opposed ball engaging surface areas respectively curved in the direction of ball travel so as conjointly to delineate a track forming a substantially unbroken continuation of the helical grooves of said screw and nut members, the bridge element being further provided with portions which maintain the balls out of contact with the thread crest of the other member as the balls are being transferred from one end to the other of their helical path, said opposed surface areas forming complementary guide lips terminating at the extremities of said track, within the annular space between said screw and nut members to partially embrace successive balls so as to deviate their course out of the helix of said other member into said passage, the balls being given a return movement throughout which the changes in direction are substantially smoothly curved.

2. Screw and nut actuating mechanism as claimed in claim 1, wherein said bridge element and the member to which it is attached, cooperate to form said transfer passage.

3. Screw and nut actuating mechanism as claimed in claim 1, wherein said bridge element is constructed in two portions which respectively form said opposed ball engaging surface areas.

4. Screw and nut actuating mechanism as claimed in claim 1, in which said bridge element at the extremities of said track, is provided with guide arms arranged to deviate the course of the balls with a guiding action.

5. Screw and nut actuating mechanism as claimed in claim 1, in which said bridge element, at the extremities of said track, is provided with guide arms arranged to first engage the balls at substantially their pitch circle level and deviate their course by a guiding action.

6. Screw and nut actuating mechanism as claimed in claim 1, wherein said bridge element comprises a segmental plate extending within the annular space between screw and nut members.

7. Screw and nut actuating mechanism as claimed in claim 1, in which the bridge element comprises a segmental plate formed in two half sections, each provided with upstanding walls which are channeled to provide said transfer passage.

8. Screw and nut actuating mechanism as claimed in claim 1, including a roof piece which cooperates with said bridge element to form said transfer passage.

9. Screw and nut actuating mechanism as claimed in claim 1, including a recess in said nut member, said bridge element comprising a segmental plate secured to the nut member adjacent said recess and located substantially entirely within the clearance space between said members, said plate together with the recess providing within the nut member a substantially uninterrupted ball path.

10. Screw and nut actuating mechanism as claimed in claim 9, wherein said segmental plate is formed in two portions which are divided along the center line of the ball path.

ALFRED PAUL MILL.

REFERENCES CITED

The following references are of record in the file of this patent:

UNITED STATES PATENTS

| Number | Name | Date |
|---|---|---|
| 1,343,846 | Rapson | June 15, 1920 |
| 1,967,482 | Schmidt | July 24, 1934 |
| 2,159,225 | Phelps et al. | May 23, 1939 |
| 2,322,000 | Douglas | June 15, 1943 |
| 2,327,013 | Briggs et al. | Aug. 17, 1943 |
| 2,450,282 | Jackson | Sept. 28, 1948 |

FOREIGN PATENTS

| Number | Country | Date |
|---|---|---|
| 558,710 | France | May 30, 1923 |